United States Patent [19]

Sloan et al.

[11] Patent Number: 5,794,804
[45] Date of Patent: Aug. 18, 1998

[54] PHARMACEUTICAL CONTAINER WITH METAL CLOSURES HAVING REDUCED PARTICULATES

[75] Inventors: James W. Sloan, Spring City; Charles Papciak, Exton; William A. Conard, Harleysville, all of Pa.

[73] Assignee: The West Company, Incorporated, Lionville, Pa.

[21] Appl. No.: 828,869

[22] Filed: Mar. 31, 1997

Related U.S. Application Data

[62] Division of Ser. No. 374,449, Jan. 18, 1995, Pat. No. 5,622,745, which is a continuation of Ser. No. 340,698, Nov. 16, 1994, abandoned.

[51] Int. Cl.$^6$ .................................................. B65D 39/00
[52] U.S. Cl. ........................... 215/249; 427/2.1; 427/284; 428/35.8
[58] Field of Search ........................ 215/249; 427/2.1, 427/284; 428/35.8

[56] References Cited

U.S. PATENT DOCUMENTS

| | | | |
|---|---|---|---|
| 3,397,661 | 8/1968 | Allman et al. | 113/121 |
| 4,000,338 | 12/1976 | Burdin | 427/184 |
| 4,224,379 | 9/1980 | Ichinoise et al. | 428/461 |
| 4,327,840 | 5/1982 | Mori et al. | 215/349 |
| 4,370,190 | 1/1983 | Ichinoise et al. | 428/461 |
| 4,395,446 | 7/1983 | Kunimoto et al. | 428/172 X |
| 4,433,792 | 2/1984 | Mandel | 220/269 |
| 4,451,506 | 5/1984 | Kobayashi et al. | 427/234 |
| 4,461,605 | 7/1984 | Stanek et al. | 413/8 |
| 4,808,453 | 2/1989 | Romberg et al. | 428/36.8 |
| 4,946,063 | 8/1990 | Heyes et al. | 220/220 |
| 4,981,101 | 1/1991 | Cataldo et al. | 118/417 X |
| 5,622,745 | 4/1997 | Sloan et al. | 427/2.1 |

*Primary Examiner*—Michael Lusignan
*Attorney, Agent, or Firm*—Panitch Schwarze Jacobs & Nadel, P.C.

[57] ABSTRACT

A method is provided for reducing particle formation during manufacture of shell caps for containers such as pharmaceutical containers. The method entails providing a solid polymeric coating on substantially all surfaces of the shell caps before permitting the coated shell caps to form coated shell caps before permitting the coated shell caps to contact each other or other objects. A pharmaceutical container which employs the shell caps also is provided. The container comprises a vial for storing medicinal compositions therein and a shell cap for sealing the vial. The shell cap includes a hollow metallic preform and a solid polymeric coating which substantially completely encapsulates the preform.

8 Claims, 3 Drawing Sheets

PHARMACEUTICAL CONTAINER WITH METAL CLOSURES HAVING REDUCED PARTICULATES

CROSS REFERENCE TO RELATED APPLICATIONS

This application is a division of application Ser. No. 08/374,449 filed , filed Jan. 18, 1995, now U.S. Pat. No. 5,622,745, which is in turn a continuation of application Ser. No. 08/340,698 filed Nov. 16, 1994, abandoned.

FIELD OF THE INVENTION

The invention relates to methods for reducing particulates during manufacture of containers. More particularly, the invention relates to methods for reducing particulates during manufacture of metallic closure members for pharmaceutical containers.

BACKGROUND OF THE INVENTION

A pharmaceutical container typically includes an open-ended vial which is filled with a medicinal composition. The vial typically is sealed with a closure member in the shape of an open-ended cylindrical cup having a base and walls extending vertically therefrom, i.e., a shell cap. The shell cap aids in preventing contamination of the composition within the vial.

Manufacture of shell caps for use in pharmaceutical containers entails punching preforms from a sheet of lacquered metal such as aluminum, and subsequently shaping those preforms into shell caps. Often, the metal sheet is lacquered on only a single surface. During these punching and forming operations, the lacquer coating is broken whereby the resulting shell caps have bare metal surfaces and edges. These bare metal surfaces and edges of the shell caps generate metal particulates when the shell caps contact each other or other objects such as during transport of the caps. In addition, lacquer particles can be produced when the shell caps contact each other or other objects such as during transport of the caps.

Various processes for coating and protecting bare metal portions of containers have been proposed. For example, U.S. Pat. No. 4,451,506 shows coating the bare metal edges of a can blank with a polyamide adhesive tape. This method, however, cannot be employed practically if the metal is exposed to high temperatures as would be incurred during sterilization by autoclaving. Substituting plastic for metal also would not be acceptable since many plastics are not capable of dimensionally withstanding temperatures associated with autoclaving.

The presence of metal and lacquer particulate impurities is of special concern since the particulates can adhere to various portions of the shell cap. As a result, when the shell caps are washed prior to assembly to the vials, particulates on the shell caps can contaminate the pharmaceutical washing machines and thereby other components which might be washed in those machines. It also is important to prevent these particulate impurities from contaminating the medicinal compositions in the pharmaceutical container. A need therefore exists for minimizing the formation of particulates during the manufacture of pharmaceutical containers and closure members.

SUMMARY OF THE INVENTION

The invention provides a method for reducing the production of particulates during the manufacture of metallic components, especially manufacture of metallic components such as shell caps intended for use as pharmaceutical closures.

The method of the invention entails applying a solid polymeric coating to substantially all bare metal portions of metallic components to form coated components prior to permitting the coated components to contact each other or other objects. Desirably, the components are in the form of shell caps which are encapsulated by the solid polymeric coating.

The shell caps may be frangible or non-frangible. Frangible shell caps typically are provided with a solid polymer coating of about 6 microns to about 25 microns thick, especially about 13 microns thick. Coating materials useful with frangible shell caps include halogenated olefins, especially polytetrafluoroethylene. Non-frangible shell caps typically have a solid polymeric coating of about 25 microns to about 200 microns thick, desirably about 100 microns thick. Coating materials useful with non-frangible shell caps include polyesters, ethylene/acrylic acid ester copolymers, acrylic acid ester/acrylic acid copolymers, copolymers of vinyl esters, polycarbonates, polyureas, polyolefins, polypropylenes and polyurethanes. Both frangible and non-frangible shell caps can include an elastomeric liner such as rubber therein.

In another aspect, the invention provides a pharmaceutical container for storing medicinal compositions therein. The pharmaceutical container includes a vial for storing the medicinal compositions, and a shell cap for sealing the vial. The shell cap comprises a metallic substrate and a solid polymeric coating that substantially completely encapsulates the substrate. The shell cap can include an elastomeric liner therein. In yet another aspect of the invention, the pharmaceutical container can include an elastomeric stopper such as rubber over the opening to the interior of the vial. In each aspect, the shell cap may be frangible or non-frangible. A polymeric cover also can be provided over the shell cap.

The method of invention advantageously provides components such as shell caps which generate much less particulates when the shell caps contact each other or other objects during transport. The shell caps can be washed in pharmaceutical washers without fear of contaminating the washer and subsequent deposition of particulates on components which later may be washed in that washer.

Having briefly summarized the invention, the invention will now be described in detail by reference to the following specification, and non-limiting examples.

BRIEF DESCRIPTION OF THE DRAWINGS

The foregoing summary, as well as the following detailed description of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings, like numerals are used to indicate like elements throughout.

DETAILED DESCRIPTION OF THE INVENTION

Figure 1:
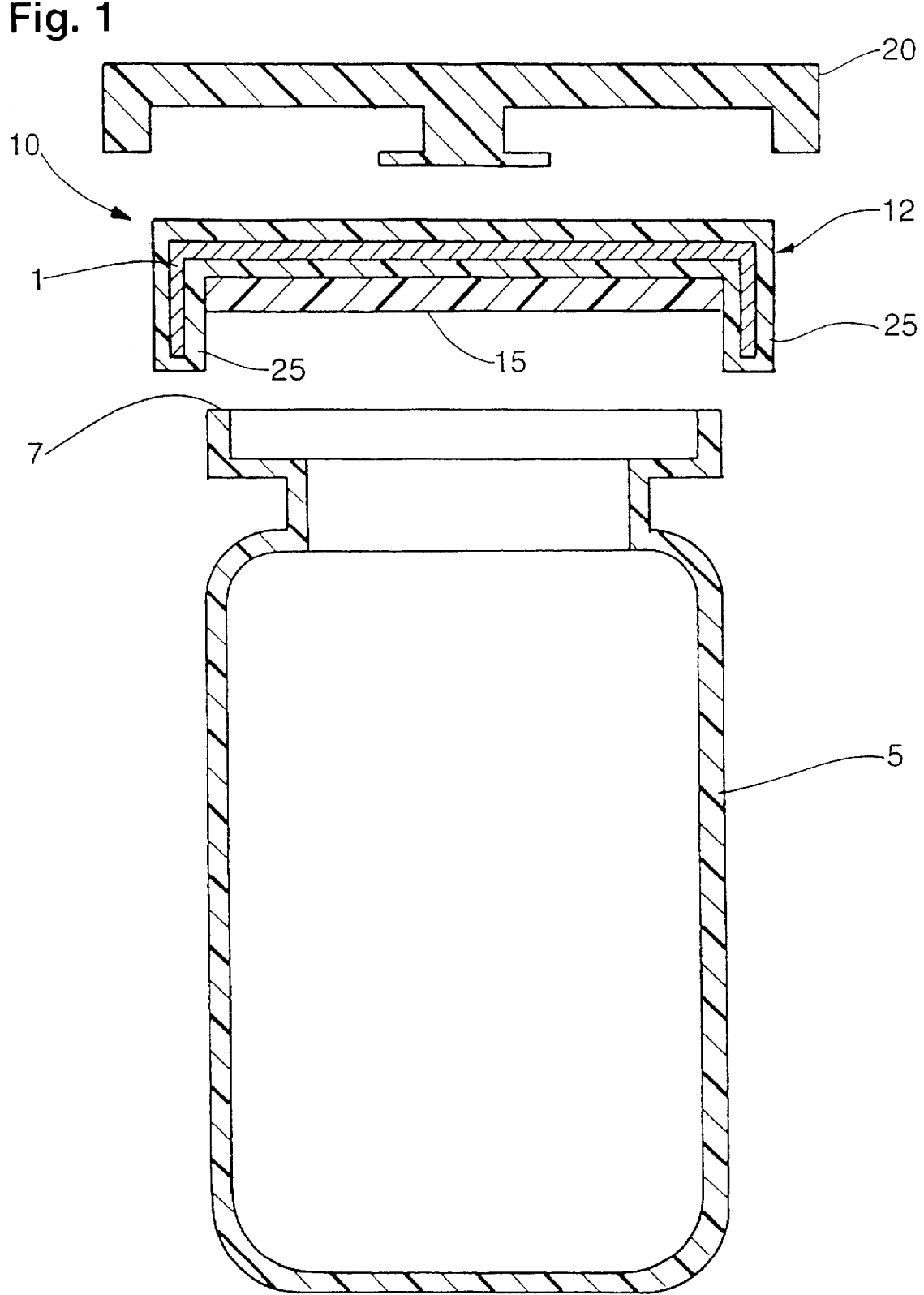
FIG. 1 is an exploded view in cross section of a pharmaceutical container including a vial and a shell cap according to the invention.

Generally, the invention entails a method for reducing the production of particulates during manufacture of metallic components such as shell caps for pharmaceutical containers. In accordance with the invention, an abrasion resistant coating, especially a solid polymeric coating, is applied onto the bare metal surfaces and edges of components such as shell caps. Shell caps can be formed by punching a preform from a flat sheet of metal that may be lacquered on one or both sides. Non-frangible shell caps employ non-scored preforms whereas frangible shell caps employ scored or bridged preforms. The preforms can be punched from metals such as aluminum, aluminum alloys, stainless steel, copper and brass, preferably aluminum alloys. Desirably, the shell caps are formed by methods which enable the edges of the shell caps to have ripple free edges. Preferably, the shell caps are formed by the TruEdge® method of The West Company, Lionville, Pa. Lacquered shell caps formed by the TruEdge® method are available from The West Company, Lionville, Pa. under product codes 54202021, 54202054, 54130236 and 54130044.

The preforms, after forming into shell caps, are coated with a solid polymeric material to encapsulate the shell caps to eliminate exposed bare metal surfaces and edges. The thickness and composition of the applied polymeric material may vary depending on whether the shell caps are frangible or non-frangible. Typically, frangible shell caps have a thinner coating of polymeric material than non-frangible shell caps so that the frangible shell cap can fracture on score lines embedded therein. The force required to lift or fracture the shell cap along the score lines incorporated into the shell cap can vary by ±20% compared to lacquered metal shell caps. Frangible shell caps typically have a coating thickness of about 6–25 microns, preferably about 13 microns. The thickness of the polymer coating does not depend on the composition of the metal of the frangible shell caps. The total thickness of the coated frangible shell cap typically is about 200 microns.

The thickness of the solid polymeric coating applied to non-frangible shell caps is about 25–200 microns, preferably, about 100 microns. The total thickness of coated, non-frangible shell caps is about 250–560 microns, preferably about 400 microns.

Solid polymeric materials can be coated onto frangible and non-frangible shell caps by known methods such as vapor deposition, solution dipping, laser deposition, and fluidized bed. Preferably, the polymeric materials are applied to the shell caps in a fluidized bed wherein the shell caps are heated and then tumbled within a fluidized bed of the polymer powder to be coated and fused onto the shell caps. Use of fluidized beds to provide coated products is known in the art. See, for example, U.S. Pat. No. 4,000,338, the teachings of which are incorporated in their entirety by reference herein. Generally, the thickness of the polymer coating which can be applied to the shell caps in a fluidized bed is about 45 micron to about 450 micron. Specific conditions of temperature, exposure time, etc. to provide polymeric coatings on the shell caps by the fluidized bed readily can be determined by the art skilled.

The polymeric compositions which may be applied by a fluidized bed to shell caps may vary depending on the metal of the shell cap. For example, if the metal of the shell cap is heat sensitive, higher modulus polymeric material may be applied to the shell cap so that the modulus of the coated shell cap is in a desired range. The polymeric compositions applied to the frangible and non-frangible shell caps are resistant to abrasion to avoid generating polymeric impurities as well as to avoid exposing the metallic surfaces and edges of the shell caps. Abrasion resistance of the polymer coating can be determined by treating "pharmaceutically washed" shell caps in a centrifugal feed bowl operating at 100–150 rpm for 30 minutes and measuring the amount of polymer and metal particulates produced.

Various polymers may be coated onto non-frangible shell caps. Useful polymers include but are not limited to polyesters such as polyethylene adipate, polyethylene sebacate, polyethylene terephthalate, poly tetra methylene isophthalates; ethylene/acrylic acid ester copolymers, acrylic acid ester/acrylic acid copolymers, ethylene/acrylic acid copolymers, styrene/methacrylic acid esters/acrylic acid copolymers, and the like; copolymers of vinyl esters such as saponified ethylene/vinyl acetate copolymers, ethylene/vinyl propionate copolymers, ethylene/vinyl acetate copolymers, acrylic acid ester/vinyl acetate copolymers and vinyl chloride/vinyl acetate copolymers; ionomers such as Surylns® produced by E.I. DuPont de Nemours & Company; copolymers of maleic anhydride with vinyl monomers, and maleic anhydride modified polyolefins such as maleic anhydride/styrene copolymers; polycarbonates such as poly-p-xylene glycol biscarbonate; polyureas such as polyhexamethylene urea; halogenated polymers such as polytetrafluoroethylene; polyurethanes, polyolefins, polypropylenes and terpolymers such as ethylene-propylene-dienes. Preferably, amide type resins such as Nylon 6, Nylon 66, Nylon 11 and Nylon 12 are coated onto the non-frangible shell cap.

A variety of polymeric compositions also can be applied to frangible shell caps. Useful polymers include but are not limited to halogenated olefins such as polytetrafluoroethylenes, preferably Teflon®, and Vidax® available from E.I. DuPont DeNemours & Company.

In a further aspect of the invention, a pharmaceutical container that incorporates the coated shell cap of the invention is provided. In this aspect, the shell cap optionally can be fitted with an elastomeric liner prior to assembly to the vial component of the pharmaceutical container. As shown in FIG. 1, a pharmaceutical container 10 is provided. Pharmaceutical container 10 includes vial 5 and shell cap 12. Optional liner 15 is fitted to the inner surface of shell cap 12 having polymeric coating 25 thereon. Shell cap 12 includes metal substrate 1 and polymeric coating 25 thereon to encapsulate substrate 1, including the surfaces and edge portions of substrate 1. When shell cap 12 is fitted to vial 5, liner 15 engages edge 7 of vial 5 to provide an additional seal to protect the contents within vial 5. Liner 15 may be any polymer having elastic properties suitable for use as a sealing material. Materials useful as liner 15 include but are not limited to elastomers such as butyl rubbers, silicone rubber, and chloro-butyl rubbers. These elastomers may be blended with additives such as oxidation inhibitors, heat stabilizers, fillers or colorants. These additives are known in the art.

Figure 2:
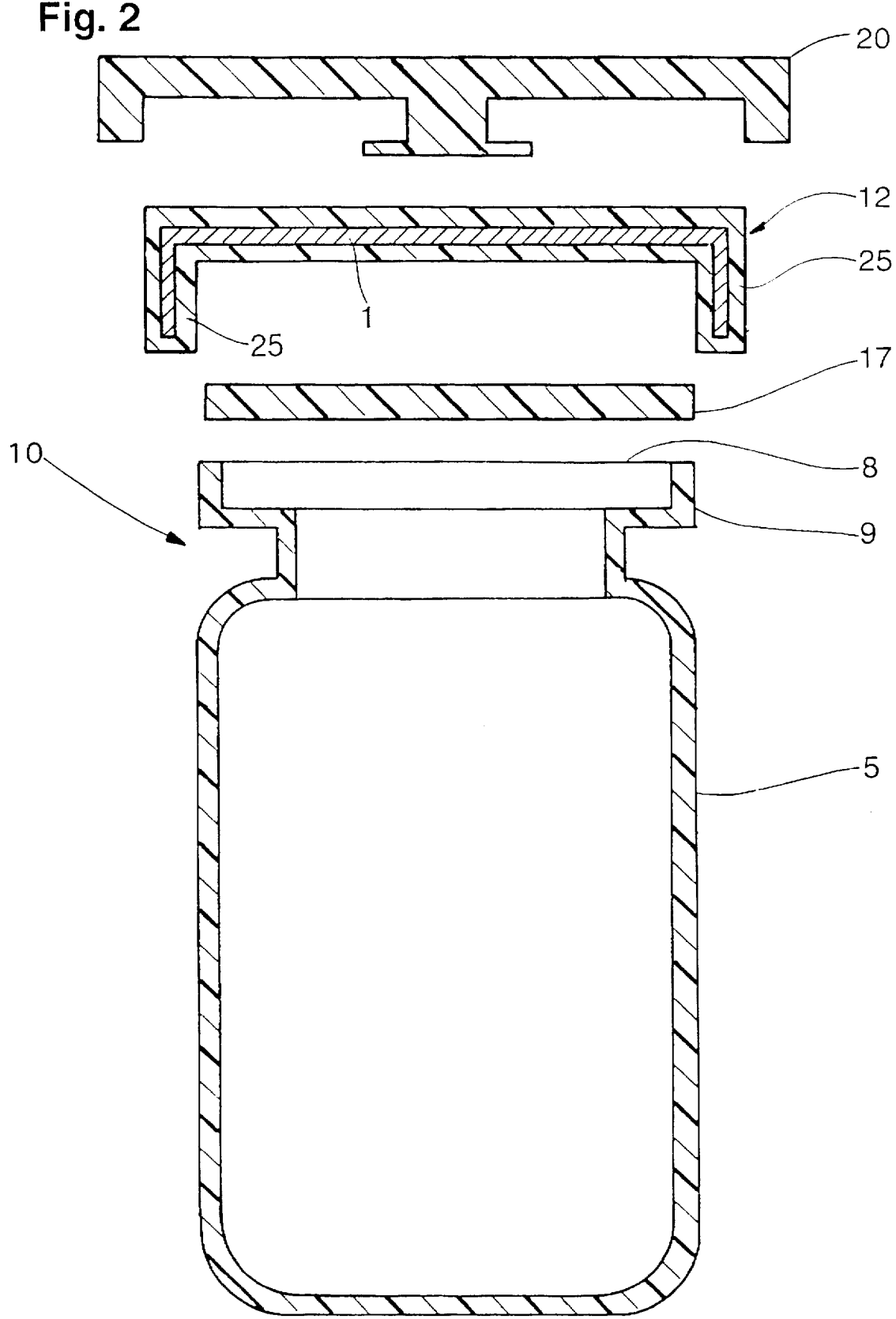
FIG. 2 is an exploded view in cross section of a pharmaceutical container including a vial and a shell cap according to the invention wherein a rubber stopper is fitted into the vial.
Figure 3:
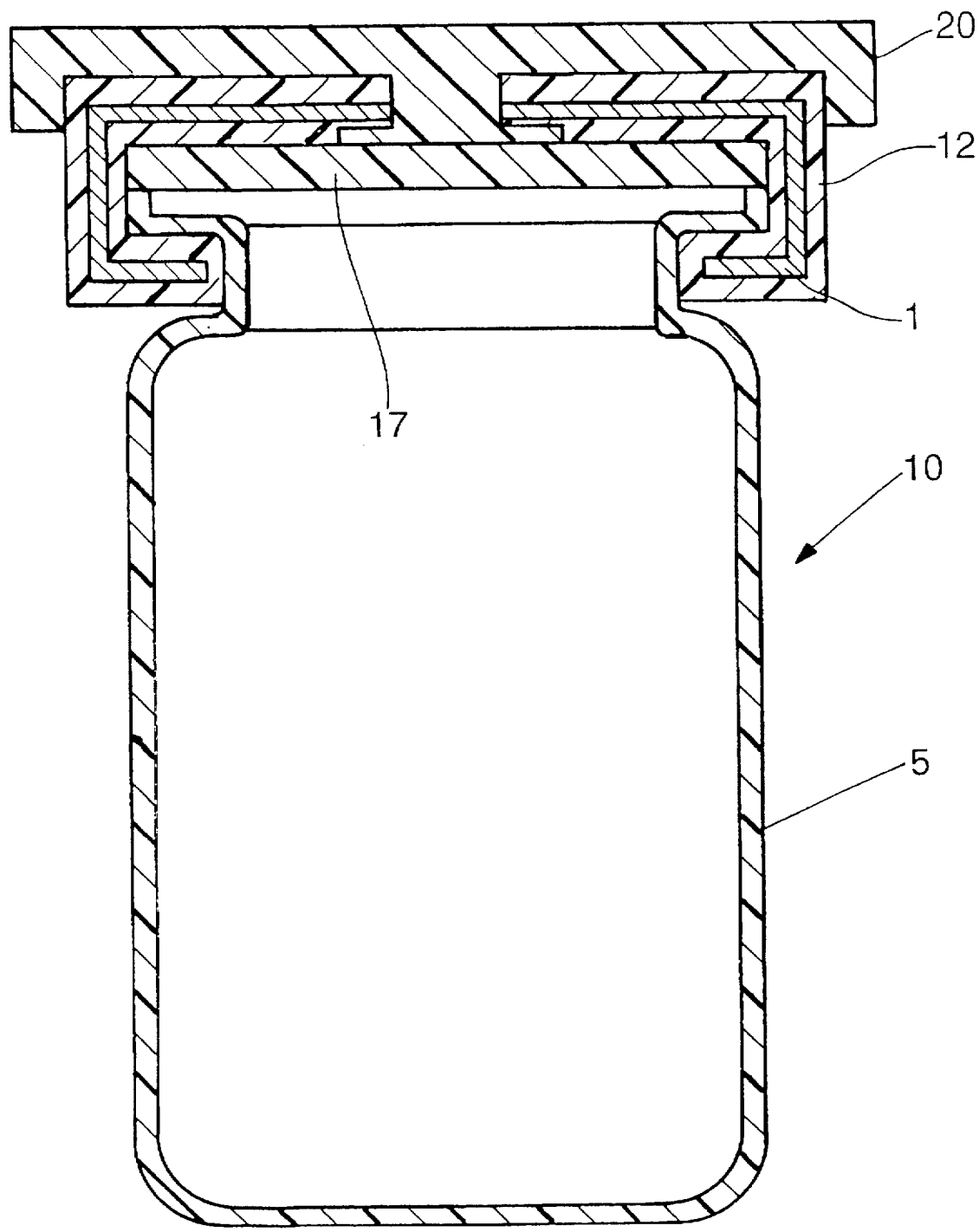
FIG. 3 is an assembly view in cross section of the pharmaceutical container shown in FIG. 2.

In a further embodiment of the invention as shown in FIG. 2 and FIG. 3, elastomeric stopper 17 is inserted into opening 8 in neck portion 9 of vial 5 prior to sealing of vial 5 with shell cap 12. Stopper 17 may be produced from elastomeric materials such as butyl rubbers, silicone rubber, and chloro-butyl rubbers. In each embodiment as shown in FIGS. 1–3, shell cap 12 can be joined to vial 5 by crimping. Polymeric coating 25 provided on shell cap 12 has sufficient thickness and strength to withstand the crimping operation without generating particulates.

In each embodiment of pharmaceutical container 10 as shown in FIGS. 1-3, cover 20 optionally can be provided over shell cap 12. Cover 20 may be formed of polymeric material and can be readily removed from shell cap 12. Cover 20 on shell cap 12, when shell cap 20 is sealed to vial 5, usefully indicates attempts at tampering with pharmaceutical container 10. Cover 20 also provides a useful dust cover for container 10.

The coated shell caps of the invention have been found to generate about one-tenth the amount of particulates produced by conventional lacquered shell caps when those shell caps contact each other or other objects during transport. The amount of particulate can be determined by depositing the shell caps into a 500 ml polypropylene container with a screw cap that is filled with about 100 ml of filtered, deionized water. The number of shell caps added to the container depends on the size of the shell cap. If the shell cap is less than about 13 mm, 25 shell caps are added. If the shell cap is larger than about 20 mm, 15 shell caps are added. The container is shaken in an orbital shaker for 30 minutes at 30 rpm. The water in the container is filtered through 0.45 micron filter paper. The number of particles measuring more than 25 microns on the filter paper are counted visually under a microscope. The number of particles per shell cap equals the number of particles divided by the number of shell caps.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A pharmaceutical container for storing compositions therein, comprising: a vial for storing pharmaceutical compositions therein, a shell cap for sealing said vial, said shell cap comprising a hollow metallic preform and a solid polymeric coating on substantially all bare metallic surfaces of said preform, wherein the polymeric coating covers edge portions of said preform and has sufficient thickness and coverage to reduce metal and lacquer particulate formation.

2. The pharmaceutical container of claim 1 wherein said shell cap comprises a base portion, wall portions, and an elastomeric liner disposed on said base portion.

3. The pharmaceutical container of claim 1 wherein said shell cap is non-frangible.

4. The pharmaceutical container of claim 3 wherein said solid polymeric coating comprises polypropylene.

5. The pharmaceutical container of claim 1 wherein said solid polymeric coating comprises nylon.

6. The pharmaceutical container of claim 1 wherein said solid polymeric coating has a thickness of about 25 to about 200 microns.

7. The pharmaceutical container of claim 2 wherein said elastomeric liner is selected from the group consisting of butyl rubber, silicone rubber and chloro-butyl rubber.

8. The pharmaceutical container of claim 1 wherein said vial includes an opening for receiving materials therethrough and an elastomeric stopper to close said opening.

* * * * *